United States Patent Office 3,629,232
Patented Dec. 21, 1971

3,629,232
2'-O-ALKANOYL-4'-ALKANOYLOXY DERIVATIVES OF ERYTHROMYCIN
Peter Hadley Jones, Lake Forest, Ill., assignor to Abbott Laboratories, North Chicago, Ill.
No Drawing. Filed Aug. 19, 1969, Ser. No. 854,807
Int. Cl. C07c 47/18
U.S. Cl. 260—210 E
3 Claims

ABSTRACT OF THE DISCLOSURE

The 2'-O-alkanoyl-4'-alkanoyloxy derivatives of erythromycin A and B are prepared by reacting 4'-hydroxyerythromycin A or B with an appropriate acid anhydride. The resulting products have antibiotic activity against *Staphylococcus aureus* Smith.

DESCRIPTION OF INVENTION

This invention relates to antibiotically active derivatives of erythromycin and in particular to the 2'-lower-O-alkanoyl-4'-lower alkanoyloxy derivatives of erythromycin. The invention especially relates to 2'-O-acetyl-4'-acetyloxy erythromycin which is active against *Staphylococcus aureus* Quinones, a strain which is resistant to erythromycin.

The use of antibiotics requires periodic assessment of various strains of microorganisms which are or may have become resistant to these agents. In vitro studies show erythromycin is holding its own very well against the common bacterial pathogens. While the staphylococci have caused more concern than other species, because of the frequency with which antibiotic resistant strains appear, on the whole the so-called hospital strains of staphylococci have remained remarkably susceptible to erythromycin. A study performed in 1963 by Schneierson and reported in the New York Journal of Medicine 65:542 [1965] showed 77% of 1,359 strains of *S. aureus* were susceptible to erythromycin.

Although these results are encouraging, in order to insure the continued effectiveness of erythromycin against as broad a spectrum of strains as is practical, it is the object of this invention to provide erythromycin derivatives that are antibiotically active against erythromycin resistant strains.

As used herein the term "lower-O-alkanoyl" is meant to denote the radicals formyl,

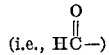
(i.e., HC—)

acetyl, propionyl and butyryl; and further to indicate that the alkanoyl radical is bonded to the erythromycin moiety through an oxygen atom. The term "loweralkanoyloxy" is meant to denote formyloxy,

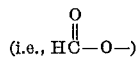
(i.e., HC—O—)

acetyloxy, propionoxy and butyryloxy.

Erythromycin itself is produced in two forms denoted A and B by cultivating a strain of *Streptomyces erythrus* in a suitable nutrient medium, as is taught in U.S. 2,653,899, Bunch et al. and in U.S. 2,806,024, Bird et al. The structure of erythromycin is represented by the following formula:

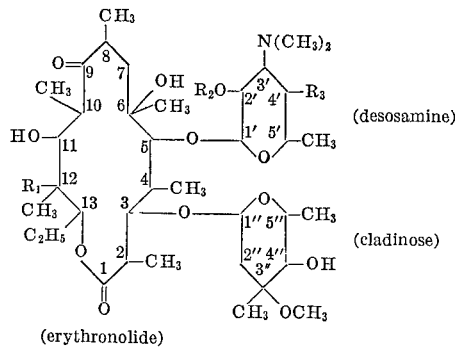

(erythronolide)

In this formula when $R_2$ and $R_3$ represent hydrogen and $R_1$ represents hydroxyl, the structure illustrated is erythromycin A. When $R_1$ is, however, also hydrogen, the structure of erythromycin B is illustrated. The term "erythromycin" when used herein without modification is meant to embrace both forms, that is both erythromycin A and erythromycin B.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by un-primed numbers. In the present invention, substitution takes place at the 2' and the 4' positions of the desosamine ring.

The first step in preparing the compounds of this invention is to prepare 4'-hydroxyerythromycin. A preparative scheme for obtaining the 4'-hydroxyerythromycin is set forth in my co-pending United States patent application, Serial number 807,444, filed March 14, 1969, and now abandoned.

The next step in preparing the compounds of this invention is to react the 4'-hydroxyerythromycin with an acid anhydride. If 2'-O-formyl-4'-formyloxy erythromycin is the product desired, the mixed formic acetic anhydride must be used. Formic anhydride is known to exist only at −78° C., but the formic moiety of the formic-acetic mixed anhydride is so reactive that it behaves in this reaction scheme as though it were the formic anhydride. Excepting formylation, however, in all other preparations, a symmetrical anhydride is used in preference to a mixed anhydride. Use of the mixed anhydride is undesirable. This is because it yields a plurality of mixed 2'-O-alkanoyl-4'-alkanoyloxy erythromycin derivatives making necessary the separation into the individual 2'-O-alkanoyl-4'-alkanoyloxy erythromycin derivatives.

4'-hydroxyerythromycin can be reacted with the acid anhydride without the addition of any catalyst since the reaction is self-catalyzed by the proximity of the tertiary amine at the 3'-position.

The 4'-hydroxyerythromycin is dissolved in a dry organic solvent inert to reaction with anhydrides or erythromycin such as an ether or a ketone, preferably acetone or ethyl ether. Since 4'-hydroxyerythromycin is pH sensitive it is advisable to carry out the reaction in a slightly alkaline environment. Therefore, a small amount of a base such as an alkali bicarbonate is added. The reaction will proceed without the addition of base, but with reduced yields, because of the decomposition of some 4'-hydroxyerythromycin. The acid anhydride is then added and the reaction mixture stirred at from 18–50° C. and preferably at about 25° C. until reaction is complete. A reaction time of from 2–4 hours at 25° C. is sufficient the longer times being required for the higher molecular weight acid anhydrides. Temperatures in excess of 50° C. are to be avoided to minimize side reactions, for example acid degradation of the 4'-hydroxyerythromycin.

After reaction is deemed completed the reactants and products are poured into a bath of ice water. The solid product precipitates and after about 1–2 hours at 0° C. the solid is separated preferably by filtration from the ice water bath, and then recrystallized from a solvent, preferably an aqueous acetone solution.

The 2'-O-alkanoyl-4'-alkanoyloxy erythromycin has antibiotic activity against *Staphylococcus aureus* Smith and is administered to warm blooded animals at a preferred dosage of 25–250 mg./kg. of body weight three to four times a day to treat infections in which this or another susceptible organism is the causative agent. Although administration is possible by the intraperitoneal route wherein the dose is dissolved or suspended in an inert physiologically harmless agent such as aqueous tragacanth, the preferred route is oral, either in capsule or tablet form. Capsules can, in addition to the active 2'-O-alkanoyl-4'-alkanoyloxy erythromycin also contain inert fillers such as lactose.

Tablets are made in the usual manner on tableting presses, and although the active esters may be tableted alone, it is preferred that a release agent such as magnesium stearate to aid in freeing the tablets from the machine dies during manufacture, together with a binder such as starch to assure good particle cohesion are included in a blend of active ingredient and diluents prior to tableting. After tableting, the tablets can be coated if desired. A preferred blend for tableting is as follows:

| | Percent |
|---|---|
| 2'-O-alkanoyl-4'- alkanoyloxy erythromycin | 77 |
| Magnesium stearate | 2 |
| Starch powder | 21 |

EXAMPLE I

2'-O-acetyl-4'-acetyloxy erythromycin A

A solution of 4'-hydroxyerythromycin A (300 mg.) was dissolved in 5 ml. acetone to which had been added 300 mg. of sodium bicarbonate. To this mixture was then added 0.4 ml. of acetic anhydride. This reaction mixture was then stirred at 25° C. for 2 hours and then poured into an ice and water mixture. After another 2 hours, the solid was filtered from the ice water bath and recrystallized from aqueous acetone to yield 270 mg. (81%) of 2'-O-acetyl-4'-acetyloxy erythromycin, having a melting point of 124–126° C. The structure was confirmed by chemical analysis and infrared spectra.

EXAMPLE II

2'-O-acetyl-4'-acetyloxy erythromycin B

A solution of 4'-hydroxyerythromycin B (300 mg.) is dissolved in 5 ml. acetone to which has been added 300 mg. sodium bicarbonate. To this mixture is then added 0.4 ml. of acetic anhydride. This reaction mixture is then stirred at 25° C. for 2 hours and then poured into a water and ice mixture. After another 2 hours, the solid is filtered from the ice water bath and recrystallized from aqueous acetone to yield 2'-O-acetyl-4'-acetyloxy erythromycin B.

In an analogous manner, the 2'-O-formyl-4'-formyloxy; 2'-O-propionyl-4'-propionyloxy; 2'-n-butyryl-4'-n-butyryloxy; and 2'-O-iso-butyryl-4'-iso-butyryloxy erythromycin esters can be prepared, using formic-acetic anhydride, propionic anhydride, n-butyric anhydride and iso-butyric anhydride.

The reaction time should be increased to about 3 hours when preparing the propionic ester, and to about 4 hours when preparing the butyric esters as compared to what is required for preparing the acetyl esters.

In order to illustrate the activity of 2'-O-alkanoyl-4'-alkanoyloxy erythromycin, the activity of 2'-O-acetyl-4'-acetyloxy erythromycin against a number of organisms is set forth below. The in vitro minimum inhibitory concentration measured by an agar dilution at pH 7.4 in micrograms/milliliter is as follows:

| Bacteria: | 2'-O-acetyl-4'-acetyloxy erythromycin A |
|---|---|
| *Staph. aureus* 9144 | .39 |
| *Staph. aureus* Smith | .39 |
| *Staph. aureus* Quinones | 6.2 |
| *Staph. aureus* Wise 155 | 25 |
| *Staph. faecalis* 10541 | .1 |
| *Klebsiella pneumoniae* 10031 | 6.2 |
| *Salmonella typhimurium* Ed No. 9 | 50 |

The compounds of this invention having a basic 3'-amino group will react with acids to form stable acid addition salts. The satisfactory salts are those which are physiologically acceptable, for example, the hydrochloride, the sulfate, and the like.

I claim:

1. A compound having the structure

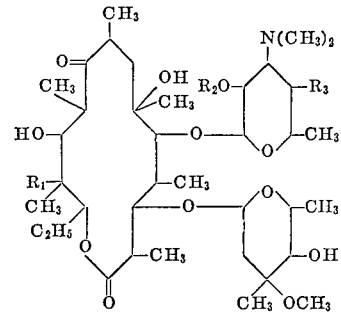

wherein $R_1$ represents hydrogen and hydroxyl, $R_2$ is lower alkanoyl, and $R_3$ is lower alkanoyloxy.

2. A compound according to claim 1 in which $R_1$ is hydroxyl, $R_2$ is acetyl and $R_3$ is acetyloxy.

3. A compound according to claim 1 in which $R_1$ is hydrogen, $R_2$ is acetyl and $R_3$ is acetyloxy.

References Cited

UNITED STATES PATENTS

| 2,993,833 | 7/1961 | Stephens | 260—210 E |
| 3,000,874 | 9/1961 | Bray et al. | 260—210 E |

LEWIS GOTTS, Primary Examiner

J. R. BROWN, Assistant Examiner

U.S. Cl. X.R.

424—180